June 16, 1925.  1,542,288
W. L. D'OLIER
SEPARATOR
Filed Oct. 20, 1920  2 Sheets-Sheet 1
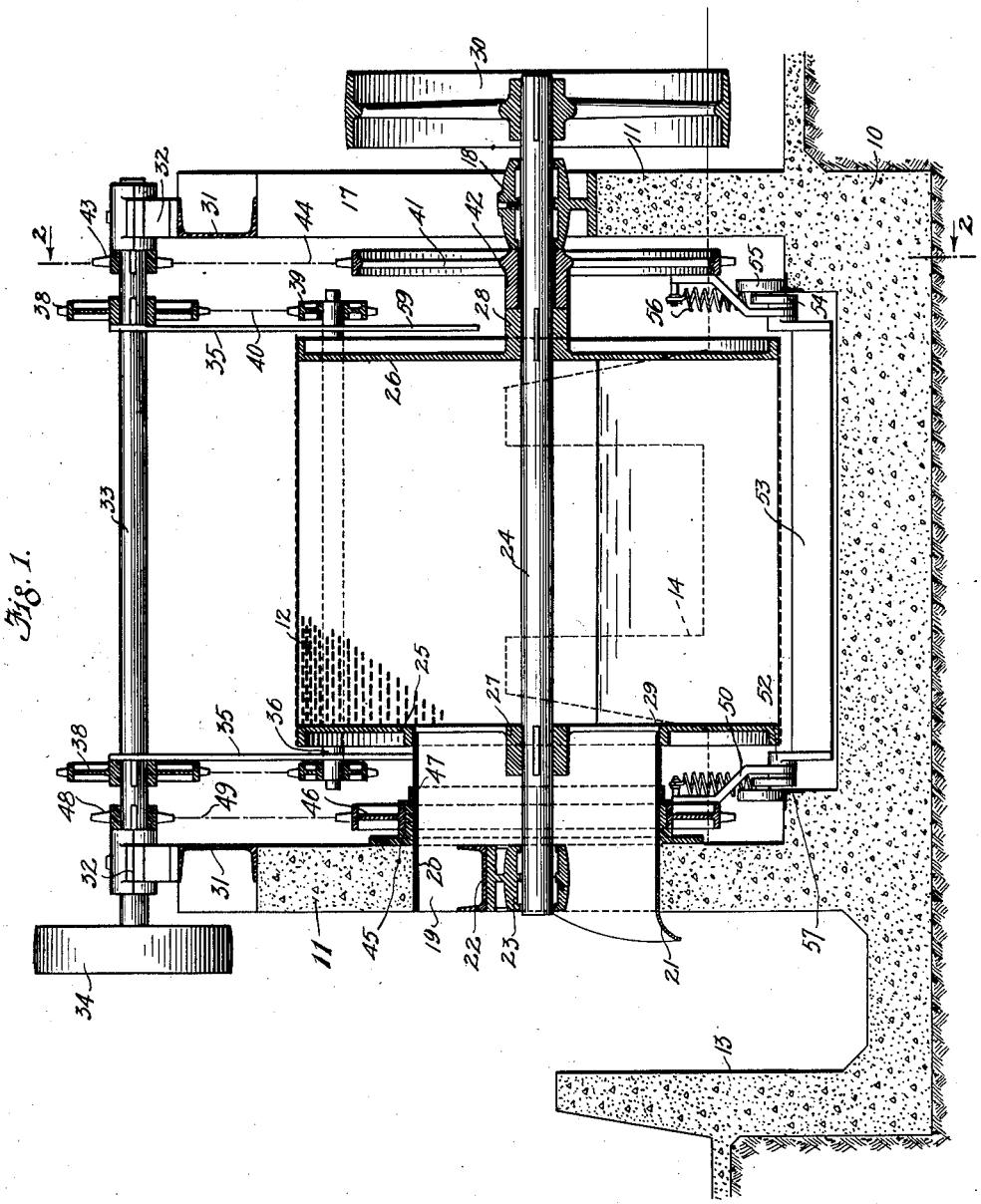
INVENTOR
WILLIAM L. D'OLIER,
BY
ATTORNEYS

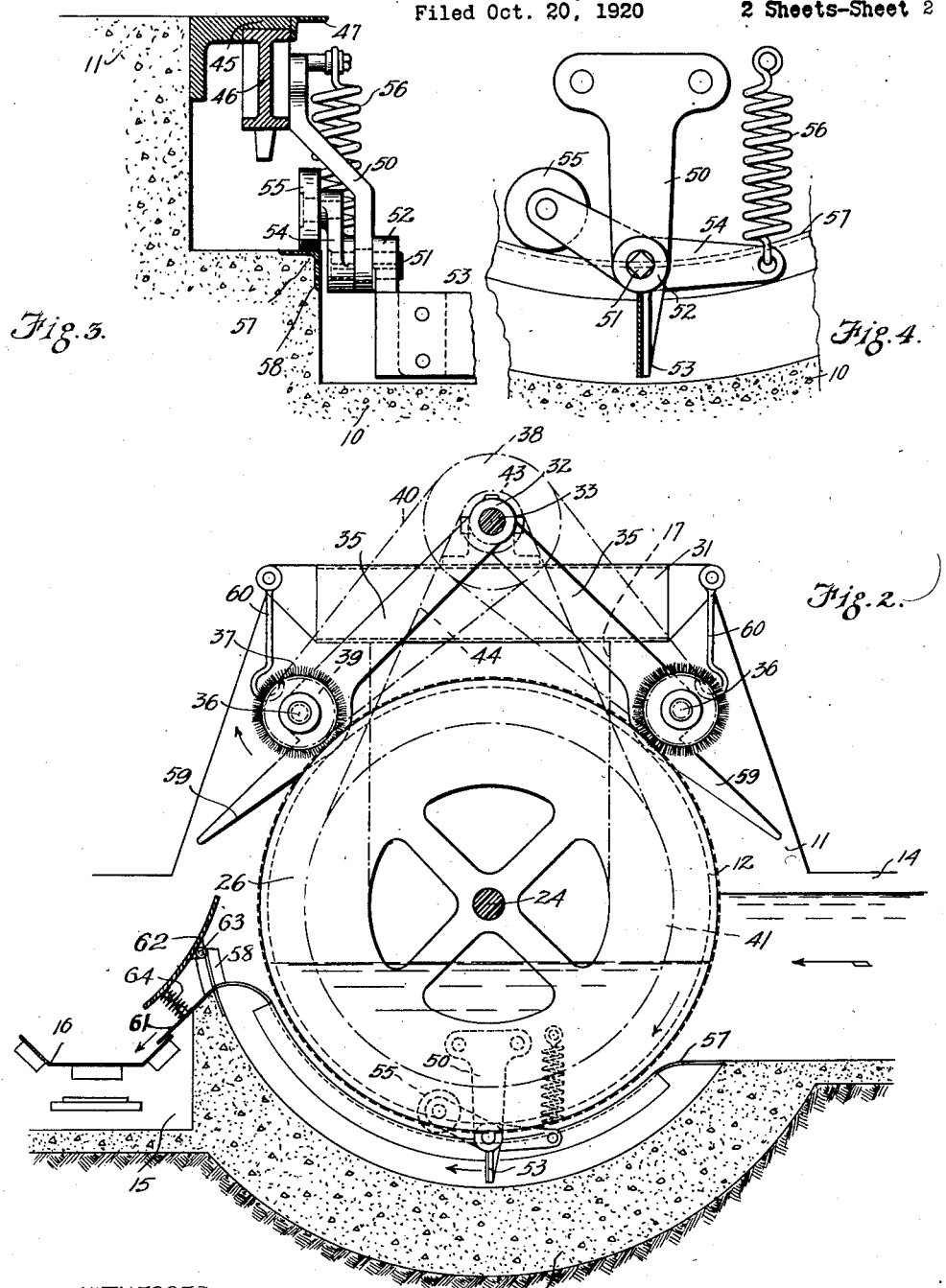

Patented June 16, 1925.

1,542,288

UNITED STATES PATENT OFFICE.

WILLIAM LIVINGSTON D'OLIER, OF PHILADELPHIA, PENNSYLVANIA.

SEPARATOR.

Application filed October 20, 1920. Serial No. 418,217.

*To all whom it may concern:*

Be it known that I, WILLIAM L. D'OLIER, a citizen of the United States, and a resident of Philadelphia, in the county of Philadelphia and State of Pennsylvania, have invented a new and Improved Separator, of which the following is a full, clear, and exact description.

This invention relates to separators for removing solids from liquids, and has reference more particularly to a separator comprising a rotary screen, and a rotary scraper for co-operation therewith, the screen and the scraper having different speeds of operation or not.

An object of the invention is to provide a separator, which, while particularly useful in sewage disposal operations, can, nevertheless, be used for a variety of purposes, which is simple and compact in construction and efficient in operation, and which is capable of high speed of operation.

A further object of the invention is to provide a separator of the class described, which rapidly and positively separates out from fluids, solid matter of different kinds, which requires little power for its operation, which is continuous in operation, and which requires little attention and supervision when in use.

A still further object of the invention is to provide a separator which can be readily installed in sewage disposal plants already constructed, which is comparatively cheap to build and install, and which is so constructed that all the parts thereof are readily accessible for repair and replacement.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a transverse, vertical section of one form of my invention:

Figure 2 is a vertical section at right angles to the section of Figure 1, taken on the line 2—2;

Figure 3 is an enlarged, fragmentary, vertical section, showing certain details of construction; and Figure 4 is a vertical section at right angles to the section of Figure 3.

Before proceeding to a more detailed explanation of my invention, it should be understood that the separator is primarily designed for use in sewage disposal operations, for the purpose of removing the solid matter contained in the liquid and semi-liquid sewage. The device can however, be applied to other purposes, and I do not wish to limit myself to this specific use. In this connection, too, I wish to point out that certain of the details of construction form no part of the invention and may be varied as desirable or necessary.

Referring more particularly to the drawings, the separator is mounted upon a suitable foundation or base 10, fashioned from concrete, masonry or the like. The base supports spaced side walls 11, between which is located a cylindrical screen 12. At one side, the base forms an outlet channel 13 which receives the fluid, after the solid matter has been separated therefrom. Leading to the separator, is an inlet channel 14 along which passes the sewage, to the separator. At the opposite side of the screen and at right angles to the channel 14, is a runway 15, in which is located a suitable belt or other conveyor 16, to receive the separated solids.

The side wall 11 remote from the channel 13 has a vertical opening 17 extending to the top thereof. Located in the opening 17 is a bearing 18. The opposite wall 11 has a substantially vertical opening 19 into which is fitted a cylindrical barrel 20 formed at the lower, outer portion, into a discharge lip 21, to direct the fluid from within the screen to the channel 13. Extending across the opening 19 is a channel support 22, upon which is hung a bearing 23 corresponding to the bearing 18, and serving with the latter, to support the shaft 24 of the screen, the sides 25 and 26 of the latter being provided with central hubs 27 and 28 keyed upon the shaft. The side 25 is provided with an annular flange 29 concentric with the hub 27 and fitting movably about the inner edge of the cylindrical barrel 20 and turning about the same as the screen revolves. The end of the shaft 24 remote from the barrel 20 is extended, and has keyed thereon a pulley 30 adapted to have power applied thereto by means of a belt, from a suitable source of power, to operate the separator. The screen 12 is fashioned from suitable reticulated sheet metal, and may be provided with openings of different shapes and sizes, as necessary.

Mounted upon the upper edges of the walls 11 are cross-supports, consisting, for example, of channels 31, each of which carries a bearing 32. A countershaft 33 is journaled in the bearings 32 and has one end extended and provided with a pulley 34 to which power is applied by means of a belt or the like. Mounted to swing upon the countershaft 33 are pairs of arms 35, corresponding pairs being spaced apart and oppositely directed, as is shown in Figure 2. The corresponding arms have journaled between them, shafts 36 carrying cleaning brushes 37 of the usual type employed in apparatus of this kind, the brushes normally resting against the upper portion of the cylindrical screen 12. Keyed upon the countershaft 33 are sprockets 38 alined with sprockets 39 carried by the shafts 36 and connected therewith by chains 40 (indicated diagrammatically).

A sprocket 41 is keyed by means of a hub 42, upon the shaft 24 between the wall 11 and the side of the screen remote from the channel 13. A correspondingly-disposed sprocket 43 is keyed upon the shaft 33, and connected with the sprocket 41 by means of a chain 44 (shown diagrammatically). Mounted upon the barrel 20, close to the wall 11, is an L-shaped collar 45. A sprocket ring 46 is mounted to revolve on the collar 45, and is held in position by means of a retaining ring 47 likewise secured upon the barrel. A sprocket 48 is keyed upon the shaft 33 and connected by means of a chain 49 (shown diagrammatically), with the sprocket ring 46.

Rigidly secured to the inner sides of the sprocket 41 and the sprocket ring 46 respectively, are offset carriers 50, at the ends of which are pivot pins 51. Depending from the pivot pins and secured thereto are hangers 52, to which is rigidly secured a scraper 53 extending longitudinally of the screen, and adjacent thereto. A bell crank lever 54 is also secured to each pin 51, at the side of the carrier remote from the hanger 52. At one end, the lever carries a roller 55, and the other end thereof is secured to a spring 56. The latter is fastened to the sprocket 41 or the sprocket ring 46 as the case may be, and tends to move the lever 54 and the scraper from a normal, operative position. The foundation 10 underneath the screen, is of arcuate form, and is provided with shelves 57 having secured thereon tracks 58 of angular cross-section, upon which the rollers 55 travel. In order that the scraper which travels about the screen may pass the brushes 37, the arms 35 are extended to form fingers 59 adapted for engagement by the scraper, so that the brushes are lifted as the scraper passes around the screen, and are then permitted to drop back into position, after the scraper has passed. Supporting hooks 60 are pivotally secured at the extremities of one of the cross members 31 and are adapted for engagement with the shafts 36, to hold the brushes raised and in inoperative positions, if desired.

It will be seen that as long as the rollers travel along the tracks 58 the scraper is held in operative position to remove solid material thrown from the surface of the screen. The ends of the track are rounded as is shown in Figure 2, to permit the rollers to pass on to the track, and leave the same, easily. As the rollers pass from the track, the springs 56 swing the levers 54 and give the scraper a dumping action, so that the solid matter is directed to the conveyor 16, and removed.

If so desired, a slightly arcuate shield 62 is mounted over the chute 61 and arranged parallel to the screen. The shield is preferably mountd to swing upon pivots 63 at the ends of the tracks 58, and is held in normal position by means of a spring 64. This construction permits a slight displacement of the shield, should it be necessary, to enable the scraper to pass freely beyond the shield. The purpose of the latter is to prevent excessive splashing of liquid on to the chute 61 and the conveyor 16.

The proportions of the sprockets, and the relative speeds of operation of the parts are such that the scraper travels less rapidly than the screen, although in the same direction, and the screen makes a number of revolutions for each revolution of the scraper. The liquid entering the separator, from the channel 14, passes into the screen. The separated fluid escapes laterally from the screen, through the barrel 20, to the outlet channel 13. There is little tendency for the liquid to flow straight through the screen, owing to the aggregated solid matter on the outside thereof, and, also, owing to the fact that the lateral escape offers less resistance.

The solid material which collects on the outside of the screen is largely removed therefrom centrifugally, particularly at or near the level of the fluid in the screen, owing to the speed of rotation of the screen. Some of this material is thrown into the space underneath the screen, and advanced by the scraper, to the end of the tracks 58, after which it passes down a chute 61, to the conveyor 16.

Having thus described my invention, I claim as new, and desire to secure by Letters Patent:

1. A separator comprising a rotary screen, and a rotary scraper arranged to travel around said screen and at a different rate of speed from that of the screen.

2. A separator comprising a rotary screen, means for directing material transversely through said screen, means for rotating said screen, a rotary scraper arranged to travel circularly around said screen, and means for rotating said scraper in the direction of rotation of said screen.

3. A separator comprising a rotary screen, means for directing material transversely through said screen, means for rotating said screen, a rotary scraper arranged to travel around said screen, and means for rotating said scraper, said scraper and said screen rotating in the same direction but at different rates of speed.

4. A separator comprising a horizontal rotary screen of cylindrical form, means for directing material transversely through said screen, means for withdrawing material from within said screen, at one end thereof, means for rotating said screen, and a scraper movably associated with said screen and arranged to travel independently thereof but in the same direction of rotation.

5. A separator comprising a rotary screen of cylindrical form, means for directing material transversely through said screen, means for withdrawing material from within said screen, at an end thereof, means for rotating said screen, a rotary scraper arranged to travel around said screen, and means for rotating said screen and said scraper, at different rates of speed.

6. A separator comprising a rotary screen, means for directing material transversely through said screen, means for rotating said screen, a rotary scraper arranged to travel around said screen, and means for dumping said scraper.

7. A separator comprising a rotary screen, a rotary scraper arranged to travel around said screen, and means whereby said scraper is operative during a part of its travel and inoperative during the remainder thereof.

8. A separator comprising a rotary screen, a rotary scraper arranged to travel around said screen, and means whereby said scraper is operative during a part of its travel and inoperative during the remainder thereof, said screen being of cylindrical form, said screen and said scraper traveling in the same direction, at different rates of speed.

9. A separator comprising a cylindrical, rotary screen having a predetermined rate of travel, means for rotating said screen, a scraper arranged to travel around said screen, and having a rate of travel lower than that of said screen, and means for rotating said scraper.

10. A separator comprising a cylindrical, rotary screen having a predetermined rate of travel, means for rotating said screen, a scraper arranged to travel around said screen, and having a rate of travel lower than that of said screen, means for rotating said scraper, means for directing material transversely through said screen, means for removing material from said screen at one end thereof, and means arranged to receive material from said scraper.

11. A separator comprising a rotary, cylindrical screen, means for rotating said screen, a scraper arranged longitudinally of said screen, and means for causing said scraper to travel around said screen in the direction of rotation of said screen.

12. A separator comprising a rotary, cylindrical screen, means for rotating said screen, a scraper arranged longitudinally of said screen, means for causing said scraper to travel around said screen, means for directing material transversely through said screen, and means for rendering said scraper operative during part of its travel around said screen.

13. A separator comprising a rotary, cylindrical screen, means for rotating said screen, a scraper arranged longitudinally of said screen, means for causing said scraper to travel around said screen, means for directing material transversely through said screen, means for rendering said scraper operative during part of its travel around said screen, a brush swingingly mounted, and normally in contact with said screen, and means controlled by said scraper, for displacing said brush, to permit said scraper to pass thereunder.

14. A separator comprising a rotary screen, means for rotating said screen, a scraper arranged to travel around said screen, means for actuating said scraper, a spring tending to displace said scraper from a normally operative position, a track, and a member associated with said scraper and adapted to engage said track, whereby said scraper is held in a normally operative position during the engagement of said member with said track.

15. A separator comprising a rotary screen and a rotary scraper arranged to travel circularly around said screen both in a clockwise direction.

16. A separator comprising a cylindrical screen, a scraper arranged to travel circularly around said screen, means for rotating said screen about its axis, and means for causing said scraper and said screen to rotate in a clockwise direction.

17. A separator comprising a rotary screen, means for directing material transversely through said screen, means for rotating said screen, a rotary scraper arranged to travel around said screen, and a hanger disposed at each side thereof to which said scraper is secured.

18. A separator comprising a rotary screen, means for directing material transversely through said screen, means for rotating said screen, a rotary scraper arranged to travel around said screen, a hanger disposed at each side thereof to which said scraper is secured, a lever controlling said scraper, and a spring secured to said lever, said spring tending to move the lever and the scraper from a normal operative position.

19. A separator comprising a rotary screen, means for directing material transversely through said screen, means for rotating said screen, an offset carrier disposed at each side of the screen, a pivot pin mounted in the end of each of said carriers, a hanger and a lever secured to each of said pins, a rotary scraper rigidly secured to the hangers and arranged to travel around said screen and controlled by said levers, and a spring secured to each of said levers and tending to move the levers and the scraper from a normal operative position.

20. A separator comprising a rotary screen, means for directing material transversely through said screen, means for rotating said screen, a carrier disposed at each side of said screen, a pivot pin mounted in the end of each of said carriers, a hanger and a lever secured to each of said pins, a rotary scraper rigidly secured to the hangers and arranged to travel around said screen and controlled by said levers, each of said levers having a spring secured to it at one end and a roller secured to it at the other end, said rollers operating to move the lever and the scraper into a normal operative position.

21. A separator comprising a rotary screen, means for directing material transversely through said screen, means for rotating said screen, an offset carrier disposed at each side of the said screen, a pivot pin mounted in the end of each of said carriers, a hanger and a bell crank lever secured to each of said pins, a rotary scraper rigidly secured to the said hangers extending longitudinally of the screen and arranged to travel around said screen, each of said bell crank levers having a spring secured to it at the end of one of its cranks and a roller mounted in the end of the other crank, and a track on which the said rollers travel, said track being of arcuate form.

22. A separator comprising a rotary screen, a hanger at each side thereof, a scraper movably carried by said hangers and arranged to travel around said screen, means, tending to move said scraper into an inoperative position, and fixed means serving to hold said scraper in operative position during a part of the travel of said scraper.

23. A separator comprising a rotary screen, a hanger at each side thereof, a scraper movably carried by said hangers and arranged to travel around said screen, means tending to move said scraper into an inoperative position, and track and roller mechanism serving to hold said scraper in operative position during a part of the travel of said scraper.

24. A separator comprising a rotary screen, a scraper arranged to travel around said screen, a brush mounted adjacent to said screen, and adapted to be moved into and out of operative position relative to said screen, and means whereby said scraper moves said brush to permit the passage of said scraper in its travel.

25. A separator comprising a rotary screen, a scraper arranged to travel around said screen, pairs of corresponding arms mounted to swing above said screen, brushes carried by said corresponding arms mounted adjacent to said screen and adapted to be moved into and out of operative position relative to said screen, and a finger carried by each arm cooperating with said scraper to move said brush to permit the passage of said scraper in its travel.

WILLIAM LIVINGSTON D'OLIER.